Patented Oct. 11, 1938

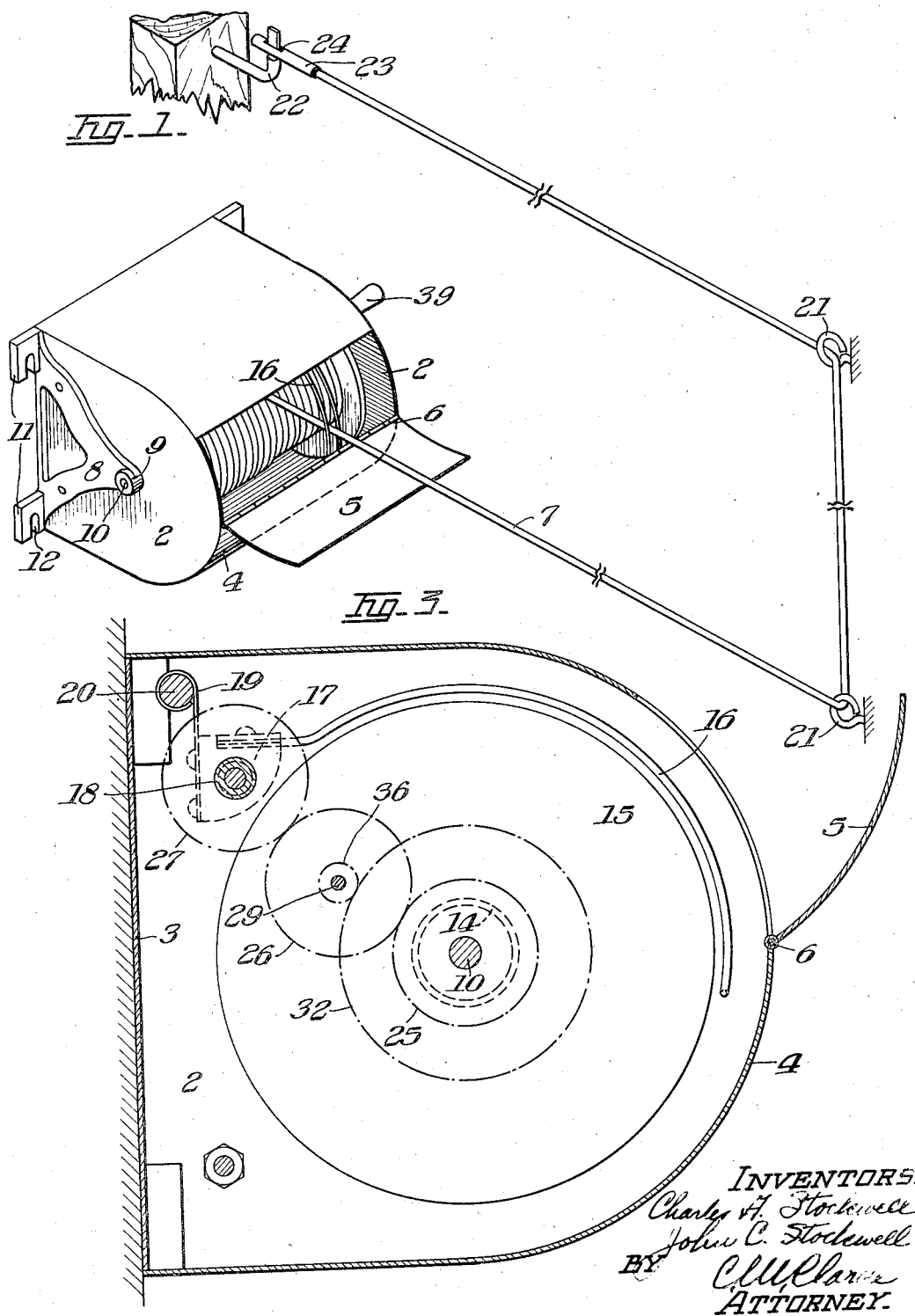

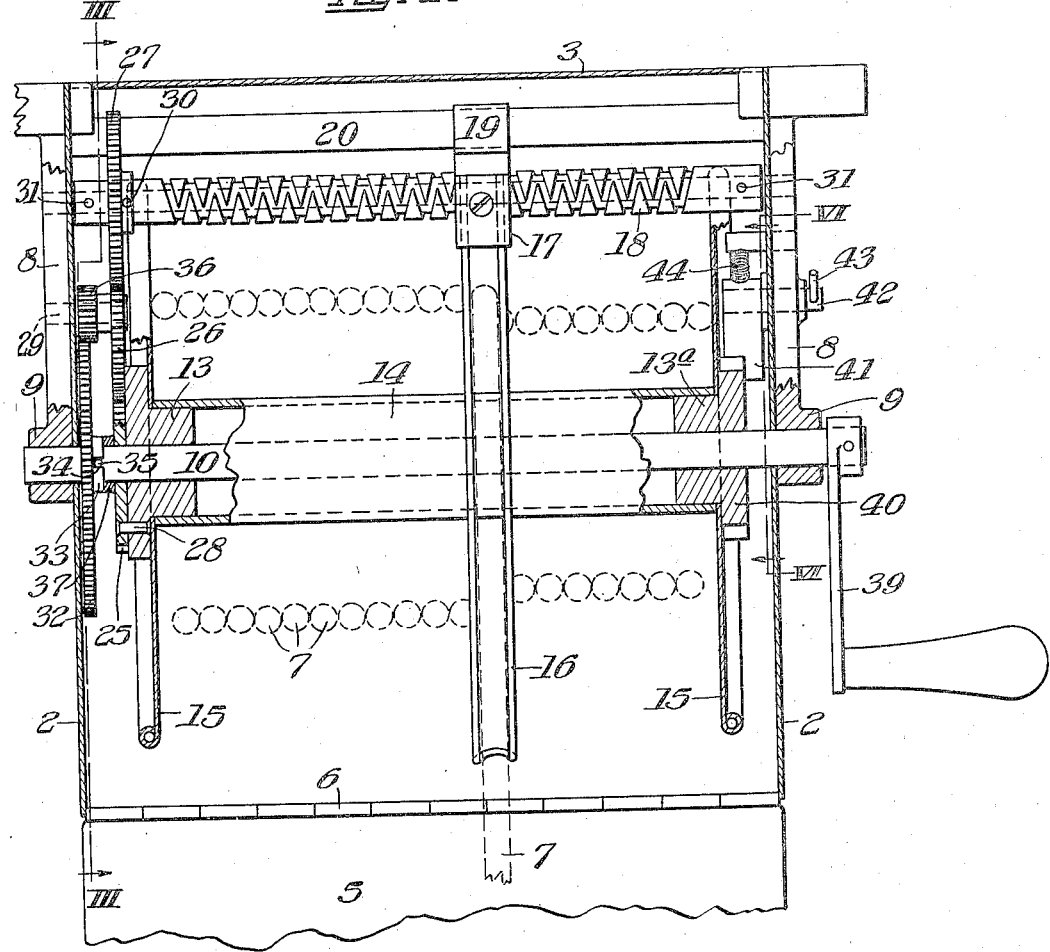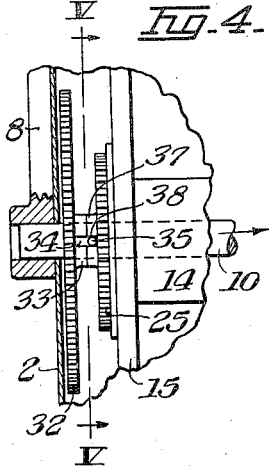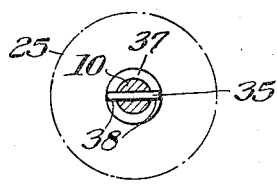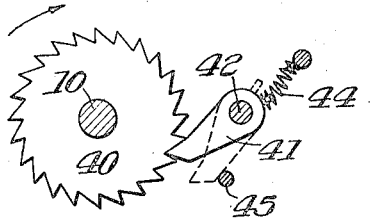

2,132,548

UNITED STATES PATENT OFFICE 2,132,548

CLOTHESLINE REEL

Charles A. Stockwell and John C. Stockwell, Pittsburgh, Pa.

Application January 24, 1938, Serial No. 186,506

7 Claims. (Cl. 242—101)

Our invention consists of an improvement in winding and unwinding reels for a clothesline and the like. It has for its object to provide means whereby a line may be wound upon and unwound from a spool or suitable cylindrical device.

Such spool is mounted within an enclosing casing and provided with controlling means governing manually exerted power whereby the line may be subjected to stretching or tightening tension; or to proportionately high speed retraction or retrieving winding; means whereby the line may be drawn out freely for initial location and attachment, and means for controlling the winding and unwinding of the line on the spool or drum, together with various other features as hereinafter more fully described.

The machine comprises in its entirety a suitable casing or supporting frame provided with a transverse shaft carrying the winding spool, gearing whereby the speed of rotation is controlled by longitudinal shifting of the winding shaft, and locking mechanism for the spool, manually operative for preventing reverse rotation of the spool, as in final tightening.

One preferred construction is illustrated in the accompanying drawings, in which:

Fig. 1 is a general view in perspective illustrating the device mounted in operative relation to guiding and terminal connection means for the line;

Fig. 2 is an enlarged sectional plan view showing the mechanism in operative condition for fast winding of the line;

Fig. 3 is a cross section on the line III—III of Fig. 2;

Fig. 4 is a detail sectional view showing the winding shaft in shifted position for change gear operation;

Fig. 5 is a sectional detail view on the line V—V of Fig. 4;

Fig. 6 is a similar view on the line VI—VI of Fig. 2 showing the controlled ratchet and pawl mechanism.

The mechanism is contained within a suitable casing, preferably of sheet metal, consisting of the endmost walls 2, 2, a rear wall 3 capable of application to any flat surface as the wall of a building or other such support, and an opposite semi-cylindrical enclosing wall 4 provided with an opening and closing gate 5 hinged thereto at 6. Gate or door 5 is adapted to be opened and closed, and when opened as in Fig. 1, to allow for passage of the line 7. When closed, the gate 5 lies flush with the main semi-cylindrical wall portion 4 for weather protection, enclosing the interior and its parts.

Endmost brackets 8 provide centrally arranged bearings 9 for mounting of the central shaft 10, also rearwardly extending arms terminating in attaching lugs or flanges 11 adapted to be secured against the wall surface or post by bolts or the like, extending through the open slots 12. Such bolts may be provided with tightening nuts or the usual bolt heads, as preferred.

If preferred, the end walls 2 may be made entirely of cast metal, including the several shaft bearings and attaching lugs, in one integral casting.

Shaft 10 is rotatably mounted through the endmost hubs 13 and 13a carrying the winding spool or reel 14 and its terminal heads or flanges 15, upon and between which endwise the cord 7 is wound.

The inner end of the cord is secured to one end of the spool 14 in any suitable manner and is designed to be wound upon and unwound from the spool progressively from one end to the other, subject to the automatic spacing fork 16.

Fork 16 consists of a bifurcated arcuate arm, between the members of which the cord 7 passes, and the fork is secured to a feed control nut 17 engageable with the right and left hand double groove feed screw 18, of well known construction. Nut 17 is provided with a controlling arm 19 slidably engaging a transverse shaft or bar 20 extending across from and between the opposite end walls 2, at the upper corner portion thereof, as in Fig. 3.

As the double thread screw 18 is rotated, in conformity with the winding or unwinding of the spool, the fork 16 will be thrust synchronously back and forth, in conformity with the winding or unwinding of the line, as indicated in Fig. 2.

It is desirable in such construction to provide for free paying out of the cord in passing it through guides 21, if used, and in securing it to a terminal attachment device, such as the hook 22, as in Fig. 1. The end of the line is provided with a tip 23 having a slot 24, fitting over the upturned end of the hook, either directly or after the line has been passed through the guides 21 for corner disposition. The line, of course, may be directly attached to the bracket 22 when used in a single straight line form, dependent upon the length to be utilized. In such case bracket 22, or another similar bracket, should of course be located in proper relative position.

In providing for the concurrent rotation of screw 18, either in winding or unwinding the line, said screw is in constant connection with the spool by a series of interengaging gears 25, 26 and 27. Gear 25 is fixedly secured to hub 13 in any suitable manner as by rivets 28, and the middle or idler gear 26 is rotatably mounted on a supporting stud or spindle 29 extending inwardly from the end wall 2. Gear 27 is fixedly connected with the end of screw 18 in any suitable way, as by pin 30, the terminal bearing ends 31 of the screw or its shaft being rotatably mounted in both opposite end walls and the brackets 8, as shown.

A fast speed winding gear 32 is rotatably mounted around the end portion of shaft 10, and is provided with a hub 33 having a transverse slot 34 for engagement by a cross pin or key 35 of shaft 10, when the shaft is thrust inwardly to make such engagement, as in Fig. 2. When in such position gear 32 is thus in driving engagement with the shaft 10. Gear 32 engages a small gear or pinion 36 integral with or secured to middle gear 26, and revoluble with it on stud 29. When shaft 10 is in such operative connection with gear 32 rapid retrieving or winding motion is transmitted to the spool 14, due to the relative proportions of gears 32 and 36.

For effecting a reduced speed and corresponding increased tensioning power in winding the line inwardly upon the spool, gear 25 is provided with a similar hub 37 and cross slot 38, capable of being engaged by pin 35 when shaft 10 is retracted. By such retraction gear 32 becomes an idle gear rotatable on shaft 10, and shaft 10 is then in driving engagement with gear 25 for direct application of power to the spool. In either case, whether spool 14 is rotated fast or slow, the same relative speed will be maintained between the spool and the feeding screw 18, for regulated winding or unwinding of the line.

It will be understood that in shifting shaft 10 it is necessary to first rotate it sufficiently to bring slots 34 and 38 into register, which may be easily done by manipulation of the winding crank 39.

In either such position, assuming the line to be completely wound on the spool, it may be freely drawn outwardly and connected by its opposite terminal. Thus retraction of the shaft 10 and engagement between pin 35 and slot 38 enables the application of greatest power in winding up slack of the line to the point of desired tension for use. To prevent reverse unwinding, the opposite end of the spool is provided with a ratchet wheel 40 which may be a portion of the opposite hub 13a, or fixedly connected therewith, or with the shaft 10 as preferred.

Cooperating with ratchet wheel 40 is a pawl 41 mounted on an actuating stem 42 having a finger piece 43 and a controlling spring 44 for holding the pawl at one side or the other of the dead center spring bearing, in locking or unlocking position, as indicated in Fig. 6, and as limited by an abutment 45.

By flipping the finger stem 43 the pawl may be thrown into engaging position so that as the ratchet wheel 40 is rotated for tight winding in the direction of the arrow, pawl 41 will interengage and lock the ratchet against reverse movement, maintaining the line in taut stretched condition as desired for use.

When thus used and the free line is to be returned to the casing, it is desirable to do so rapidly and with the minimum number of rotations of shaft 10. The pawl 41 is ineffective or may be thrown out to inoperative position and shaft 10 is thrust inwardly for driving engagement with gear 32, whereupon high speed rewinding motion is transmitted to the spool and the line is re-wound rapidly, with proper replacement around and upon the spool, the gate 5 then being closed until the device is desired for further use.

The general construction and operation of the invention will be understood from the drawings and the foregoing description.

It provides for free and easy paying out of the line, for powerful stretching upon it in reverse tightening for use by low gear direct crank and shaft engagement, and for rapid retraction or retrieving through gears 32, 36, 26 and 25, with a minimum number of crank and shaft rotations, after such use.

The device is comparatively simple in construction, completely protected from the weather, easily manipulated, and possesses advantages of efficiency and economy in contrast to anything heretofore devised.

It will be understood that it may be changed or varied in detail construction, speed of operation in either direction by modification of the gear ratios, or in other respects by the skilled mechanic, but that all such are to be considered as within the scope of the following claims.

What we claim is:

1. In a clothesline reel, the combination with a supporting frame, of a winding shaft, a spool freely rotatable thereon having an endmost gear wheel fixed thereto, an engaging gear wheel therefor having a companion gear wheel rotatable therewith, a gear wheel freely rotatable on the shaft engaging the companion gear, and means on the shaft connecting it alternatively with the freely rotatable and endmost fixed gear respectively upon longitudinal shifting of the shaft.

2. In a clothesline reel, the combination with a supporting frame, of a longitudinally movable winding shaft having a key, a spool freely rotatable on the shaft having an endmost gear wheel fixed thereto provided with a slot for said key for direct rotation of the spool, an engaging gear wheel therefor having a companion gear wheel rotatable therewith, a gear wheel freely rotatable on the shaft engaging the companion gear and provided with a slot for the shaft key whereby longitudinal shifting and rotation of the shaft will effect rotation of the spool at a variable speed.

3. In a clothesline reel, the combination with a supporting frame, of a longitudinally movable winding shaft having a key, a spool freely rotatable on the shaft having an endmost gear wheel fixed thereto provided with a slot for the shaft key for direct connection with the spool, a gear wheel engaging the endmost gear having a pinion gear rotatable therewith, a gear wheel freely rotatable on the shaft engaging the pinion and provided with a slot for the shaft key whereby rotation of the shaft will effect rotation of the spool at a speed in excess of that resulting from key engagement with the endmost gear under normal shaft rotation.

4. In a clothesline reel, the combination with a supporting frame, of a winding shaft, a spool freely rotatable thereon having an endmost gear wheel fixed thereto, an engaging gear wheel therefor having a companion gear wheel rotatable therewith, a gear wheel freely rotatable on the shaft engaging the companion gear, means on the shaft connecting it alternatively with the freely rotatable and endmost fixed gear respectively upon longitudinal shifting of the shaft, a reversing thread screw shaft rotatably mounted in the frame having a gear wheel in geared connection with the endmost gear of the spool through said engaging gear, and a line shifting guide having a nut engaging the screw shaft.

5. In a clothesline reel, the combination with a supporting frame, of a winding shaft, a spool freely rotatable thereon having an endmost gear wheel fixed thereto, an engaging gear wheel therefor having a companion gear wheel rotatable therewith, a gear wheel freely rotatable on the shaft engaging the companion gear, means on the shaft connecting it alternatively with the freely rotatable and endmost fixed gear respectively upon longitudinal shifting of the shaft, a reversing thread screw shaft rotatably mounted in the frame having a gear wheel in geared connection with the endmost gear of the spool through said engaging gear, and a line shifting guide having a nut engaging the screw shaft and a slidably mounted extension for maintaining the guide outwardly beyond the spool.

6. A clothesline reel comprising a casing having a rear wall, end walls provided with shaft bearings and supporting extensions, and top and bottom walls and a rounded front wall having an opening and closing door; a longitudinally adjustable winding shaft mounted in the end walls having at one end a crank handle and at the other end a cross pin key, a spool freely rotatable on the shaft having an endmost fixedly connected gear wheel provided with a key slot, a reversing thread screw shaft rotatably mounted in the end walls, a line shifting guide having a nut engaging the screw shaft, a gear wheel on the screw shaft, an intermediate gear connecting the screw shaft gear with the spool gear and provided with a pinion, and a large diameter gear wheel rotatably mounted on the winding shaft engaging the pinion and having a key slot engageable by the cross pin key for transmitting accelerated winding of the spool when the large diameter gear is in operative engagement with the winding shaft.

7. In a clothesline reel, the combination with a supporting frame, of a winding shaft, a spool freely rotatable thereon having an endmost gear wheel fixed thereto, an engaging gear wheel therefor having a companion gear wheel rotatable therewith, a gear wheel freely rotatable on the shaft engaging the companion gear, means on the shaft connecting it alternatively with the freely rotatable and endmost fixed gear respectively upon longitudinal shifting of the shaft, a ratchet wheel secured to the opposite end of the spool, and a co-operating manually releasable pawl engageable with the ratchet wheel adapted to prevent reverse rotation of the spool.

CHARLES A. STOCKWELL.
JOHN C. STOCKWELL.